(12) United States Patent
Waslowski et al.

(10) Patent No.: US 7,760,338 B2
(45) Date of Patent: Jul. 20, 2010

(54) METHOD FOR THE DETECTION OF AN OBJECT AND OPTOELECTRONIC APPARATUS

(75) Inventors: Kai Waslowski, Emmendigen (DE); Gerhard Merettig, Sexau (DE)

(73) Assignee: SICK AG, Waldkrich/Breisgau (DE)

( * ) Notice: Subject to any disclaimer, the term of this patent is extended or adjusted under 35 U.S.C. 154(b) by 345 days.

(21) Appl. No.: 12/017,601

(22) Filed: Jan. 22, 2008

(65) Prior Publication Data

US 2008/0212066 A1 Sep. 4, 2008

(30) Foreign Application Priority Data

Jan. 30, 2007 (DE) .................. 10 2007 004 632

(51) Int. Cl.
*G01P 3/36* (2006.01)
(52) U.S. Cl. ....................................... 356/28
(58) Field of Classification Search ........ 356/3.01–28.5
See application file for complete search history.

(56) References Cited

U.S. PATENT DOCUMENTS

| 4,470,681 A | 9/1984 | Johnson |
| 5,076,687 A | 12/1991 | Adelson |
| 6,344,893 B1 * | 2/2002 | Mendlovic et al. ......... 356/3.14 |

FOREIGN PATENT DOCUMENTS

| DE | 19721257 | 11/1998 |
| DE | 202005012479 | 8/2005 |
| DE | 102006007764 | 8/2007 |
| EP | 1134595 | 9/2001 |
| FR | 2761151 | 9/1998 |
| JP | 2000337869 | 12/2000 |

OTHER PUBLICATIONS

Official letter from the German Patent Office dated Oct. 23, 2007 for German Application No. 10 2007 004 632.6.
European Search Report dated Apr. 17, 2008 Relating to European Patent Application No. 08000124.1.
Translation of European Search Report dated Apr. 17, 2008 Relating to European Patent Application No. 08000124.1.

* cited by examiner

*Primary Examiner*—Thomas H Tarcza
*Assistant Examiner*—Luke D Ratcliffe

(57) ABSTRACT

The present invention relates to a method for the detection of an object by means of an optoelectronic apparatus, wherein light rays generated by a light source are incident onto an object as a light bead and the light rays scattered back and/or reflected from the object are detected by a receiver arrangement in accordance with the triangulation principle and an object detection signal including information on a scanning distance between the apparatus and the object is output, with the light rays acting via an imaging element on a pixel array consisting of photodetectors in the receiver arrangement. The method is characterized in that the imaging element is only an array of individual imaging elements positioned before the pixel array and generating a received signal pattern on the pixel array corresponding to a plurality of mutually spaced apart images of the light bead; and in that the information on the scanning distance is determined from the received signal pattern. The present invention furthermore relates to an optoelectronic apparatus for the carrying out of the method.

29 Claims, 2 Drawing Sheets

METHOD FOR THE DETECTION OF AN OBJECT AND OPTOELECTRONIC APPARATUS

Figure 1:
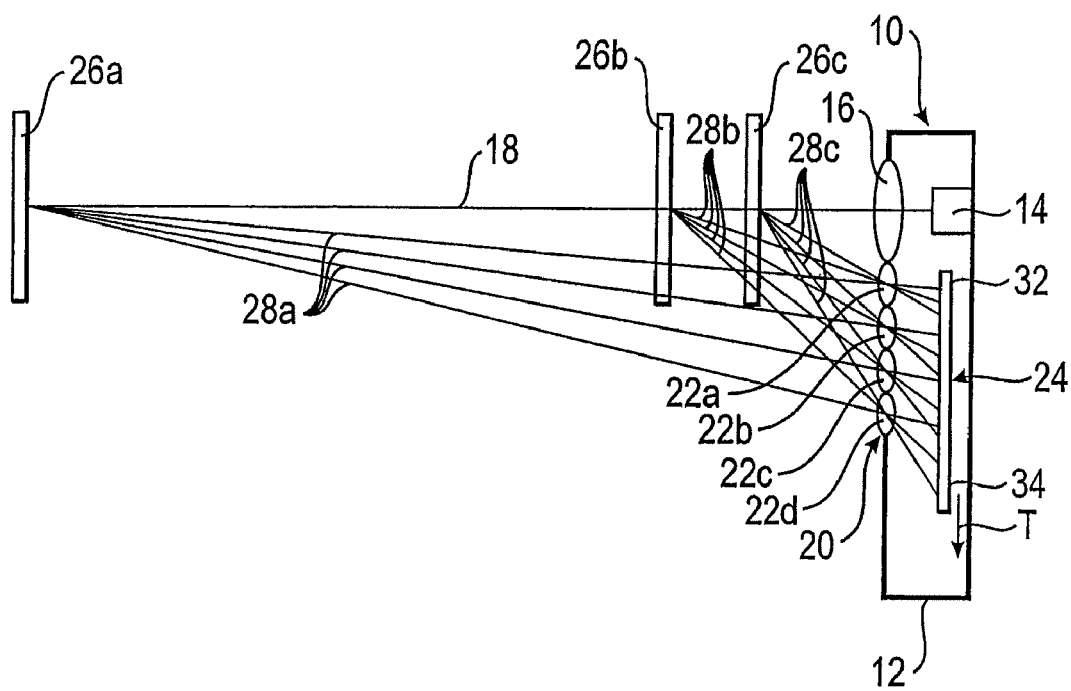

The present invention relates to a method for the detection of an object by means of an optoelectronic apparatus, wherein light rays generated by a light source are incident onto an object as a light bead and the light rays scattered back and/or reflected from the object are detected by a receiver arrangement in accordance with the triangulation principle and an object detection signal including information on a scanning distance between the apparatus and the object is output, with the light rays acting via an imaging element on a pixel array consisting of photodetectors in the receiver arrangement.

The present invention furthermore relates to an optoelectronic apparatus for the detection of an object in accordance with the triangulation principle.

Such triangulation light sensors and methods are used to obtain information on the spacing of an object moving into the monitored zone of the triangulation light sensor. A bundle of rays transmitted from a light source generates a light bead of limited diameter on the object located in the beam path. The rays reflected or scattered back in the direction of the triangulation light sensor from the light bead are there incident onto an optical receiver device which is as a rule arranged at the side next to the light source and are imaged more or less sharply by said optical receiver device on a downstream sensor. In this context, the angle at which the reflected or remitted light rays are incident onto the optical receiver device, and therefore also the lateral position at which the rays are incident onto the receiver, depend on the spacing of the object from the triangulation light sensor. The spacing of the object from the triangulation light sensor can be determined from the spacing of the light bead imaged onto the receiver from a reference point by means of triangulation with knowledge of the spacing between the optical receiver device and the receiver plane as well as of the location and direction of the bundle of rays transmitted by the light source.

An apparatus is known from U.S. Pat. No. 5,076,687 in which light received from an object is imaged onto a photodetector array by means of a converging lens and by means of a lens array arranged in the image field of the converging lens.

With triangulation light sensors of a conventional construction, the range and the distance resolution are restricted by the focal length and by the luminous intensity of the optical receiver device. This means that optical receiver devices with a large focal length and a large diameter have to be used with triangulation light sensors with a high range and good distance resolution.

Due to this, corresponding triangulation sensors have a large construction, in particular a large construction depth. Frequently, however, the construction space available for the light sensor is restricted, in particular in its depth, in dependence on the respective application.

There is furthermore the disadvantage that the production of optical systems having a large diameter, i.e. a large aperture, with low imaging defects which do not restrict the distance resolution, is complex and expensive.

It is therefore the object of the present invention to provide a method and an apparatus for the detection of an object which are improved with respect to range, resolution and/or construction depth.

This object is satisfied by the features of claim 1 and in particular by a method of the initially named kind which is characterized in that the imaging element is only an array of individual imaging elements which is positioned before the pixel array and which generates a received signal pattern on the pixel array corresponding to a plurality of mutually spaced apart images of the light bead and in that the information on the scanning distance is determined from the received signal pattern.

In such a method, the information on the scanning distance of the object from the apparatus is not obtained from the position of an individual light bead on a pixel array, but from a plurality of individual images of the light bead. It must be pointed out at this point that the term "position" generally means the position in the direction of triangulation, i.e. the direction in which the images of the light bead move on a change in the scanning distance. The information on the scanning distance of the object from the optoelectronic apparatus is therefore not contained in the absolute position of an individual light bead, but is distributed over a larger area of the pixel array. In this connection, local defects such as semiconductor defects of the pixel array have a correspondingly lesser effect.

A further advantage consists of a received signal pattern, which is generated by the array of individual imaging elements and which originates from passive or active light sources outside the beam path of the light source, differing from those received signal patterns which can be generated by objects inside the monitored zone. This advantage will be explained in more detail in the following.

Yet another advantage is due to the fact that only some of the light bead images originating from objects located very close to the triangulation light sensor impact on the pixel array due to the oblique incidence onto the array of individual imaging elements. Since the intensity of the light bead images of such objects located in the so-called near zone is usually larger than that of objects which are further remote, i.e. are located in the so-called far zone, the incident total light amount is further reduced by the reduction of the number of the light bead images incident onto the pixel array. The higher intensity of the individual light beads caused by the lower spacing can thereby be compensated and the dynamic demands on the pixel array and on downstream evaluation circuits can thus be reduced.

In accordance with a preferred variant of the method, the position of at least one image of the light bead is determined in the received signal pattern, with the position of an image being associated with that individual imaging element which has generated the respective image. The scanning distance is determined from the spacing between the at least one position and a reference point associated with the respective individual imaging element. The spacings of the images of the light bead from their associated reference points on the pixel array or in the received signal pattern are therefore calculated in each case. A respective separate calculation of the scanning distance is thus carried out for a plurality of individual imaging elements or also for all individual imaging elements while taking account of the geometry of the triangulation light sensor, i.e. of the mutual spacings of the components. A mean value can subsequently be formed over the scanning distances.

In accordance with an advantageous further development of the method, a reference signal pattern is generated for at least one reference scanning distance and the position of at least one image of the light bead is determined in the reference signal pattern, with the position of the image being associated as a reference point with that individual imaging element which has generated the respective image. The scanning distance is determined from at least one spacing between a light bead position determined from the received signal pattern and associated with the same individual imaging element and the reference point associated with the same individual imaging element and determined from the reference signal pattern and the reference scanning distance. This method variant is similar to the variant described above with the difference that the reference point or points are not fixed absolutely, but via a reference signal pattern which was generated at a specific scanning distance, the reference scanning distance.

In accordance with the two aforesaid method variants, it is therefore possible to determine for each individual imaging element a movement of the image of the light bead generated by this imaging element with respect to the corresponding images in the reference signal pattern or with respect to reference points defined with respect to the pixel array. In comparison with a conventional light sensor, it is therefore not only a single position difference which is used for the determination of the scanning distance, but a plurality of spacings whose number corresponds to the number of the individual imaging elements in the best case.

It is, however, also possible, only to take some of the images into account. In particular images which are defective due to defects of the pixel array, images caused by interference light or images not to be taken into account for other reasons can in particular thereby be excluded from the determination of the scanning distance.

It is advantageous for the positions of at least two images of the light bead to be determined in the received signal pattern, with in each case the position of the image being associated with that individual imaging element which has generated the respective image, and for the scanning distance to be determined from at least one spacing between the positions of images of the light bead respectively generated from different individual imaging elements. It is therefore possible to determine the scanning distance not only from absolute light bead image positions on the pixel array, but also from the position difference of adjacent light bead images.

It is furthermore advantageous for a respective reference signal pattern to be generated for a plurality of different reference scanning distances and to be stored together with the associated reference scanning distance and for the reference signal pattern having the highest coincidence with the received signal pattern in particular to be determined by correlation. The reference scanning distance associated with the determined reference pattern is then output as the scanning distance value.

In this method variant, a series of reference signal patterns is accordingly generated for an object arranged at different scanning distances from the triangulation light sensor and is stored so-to-say as a look-up table with the associated actually measured spacing values during a teaching phase. A received signal pattern is then compared with the stored reference signal patterns by means of suitable image processing methods during operation in order to determine the reference signal pattern with the largest coincidence with the received signal pattern. In this connection, known methods of image processing, for example correlation methods which can be carried out very fast can be used.

With a low number of reference signal patterns taken in advance, it is also possible to determine the scanning distance value to be output by interpolation with approximately the same coincidence with two adjacent reference scanning distances.

A reference signal pattern having maxima corresponding to a plurality of images of the light bead can furthermore preferably be taken at a reference scanning spacing and a modulation function is calculated from it which can adopt a positive value and a negative value, with a change from a negative value to a positive value taking place at a position at which the reference signal pattern has a maximum and a change from a positive value to a negative value taking place at a position which lies between this maximum and an adjacent maximum and is determined by a fraction of the spacing of the two maxima. The product of the received signal pattern can then be calculated using the modulation function, whereupon the sum or the integral is calculated via the product for a presettable interval of positions. The scanning distance value is then calculated from this sum or from this integral. Alternatively, a falling short of and/or an exceeding of a scanning distance threshold value in particular preset by the reference scanning distance is determined from the sign of the sum or of the integral. This variant will be looked at in more detail in the following in the description of FIG. 4.

It is advantageous for images of the light bead to be determined which differ in their intensity distribution from a preset pattern. It is therefore determined whether an image corresponds in its intensity distribution to an intensity distribution preset, for example, by a reference pattern.

The images of the light bead differing from the pattern can then not be taken into account on the determination of the information on the scanning distance or can only be taken into account with a reduced weighting. Interference light influences due to external light or objects located outside the beam path of the transmitted light source or also objects not remitting ideally such as objects with contrast differences on the surface or with reflecting surfaces can thus be identified. The risk of a miscalculation of the scanning distance due to artifacts can thereby be avoided or at least reduced.

In accordance with a preferred variant of the invention, an error message is output on the exceeding of a preset limit value for the permitted degree of images of the light bead differing from the pattern and/or an output of an object detection signal is suppressed for so long until the permitted degree of images differing from the pattern is fallen below again. The named measures are therefore taken in dependence on the degree of artifacts which is just still deemed to be permitted. It is thereby possible to adapt the interference tolerance to the respective application, to the environmental conditions and/or to the surface properties of the objects to be detected.

In a further advantageous aspect of the method, the pixel array is a two-dimensional array and an individual imaging element respectively includes a prism, with the deflection direction of the prisms being perpendicular to a triangulation plane defined by the transmission rays and the reception rays and the amount of the deflection differing for each individual imaging element. An image can then be associated with an individual imaging element based on its position perpendicular to the triangulation direction. In addition, a better separation of the generated light beads is possible since their reciprocal spacing is enlarged by the deflection perpendicular to the triangulation direction.

The object of the invention is furthermore satisfied by an optoelectronic apparatus having the features of claim 14. The object is in particular satisfied by an optoelectronic apparatus for the detection of an object in accordance with the triangulation principle having a light source for the generation of a light bead on the object, a receiver arrangement for the detection of light rays scattered back and/or reflected from an object and an evaluation unit, with the receiver arrangement having an element imaging the light rays and a pixel array consisting of photodetectors. The apparatus is characterized in that the imaging element is only an array of individual imaging elements which is positioned before the pixel array and which is designed for the generation of a received signal pattern on the pixel array corresponding to a plurality of mutually spaced apart images of the light bead and in that the evaluation unit is designed for the determination of information on a scanning distance between the apparatus and the object from the received signal pattern.

Such an apparatus works in accordance with the functional principles already explained above.

The array of individual imaging elements is preferably a microlens array including a plurality of individual lenses. With such a microlens array, the individual imaging elements are formed by a number of small thin lenses, with it not being necessary to screen the beam paths of the individual lenses from one another. Webs or the like therefore also do not have to be provided between the individual lenses.

Such microlens arrays can be manufactured in a simple and cost-effective manner, for example by hot stamping. Due to the low required thickness in comparison with the manufacture of correspondingly large and thick individual lenses for a conventional light sensor, the throughput of an injection molding machine used for this purpose can be increased since the required cooling times are shortened due to the smaller thickness with respect to large area individual lenses. The manufacture of such a microlens array with a number of small individual lenses having an optical aperture which is the same in sum as with one large individual lens is thus more cost-effective.

In an advantageous embodiment of the invention, the array of individual imaging elements includes an array of diffractive individual elements which is in particular made as a film. Such arrays, which are based on the principle of Fresnel zone plates, for example, can be manufactured particularly cost-effectively and are characterized by their small thickness. They can in particular be used on the use of monochromatic light sources.

In accordance with a preferred embodiment of the invention, the individual imaging elements have different focal lengths. It is thereby possible to focus precisely one image of the light bead sharply in the receiver plane. The respective sharp-focused light bead can be determined from the shape of the intensity distribution. Light beads which are just focused sharply at a specific scanning distance are weighted more heavily than other light beads or blurred light bead images can be masked. The detection of non-ideally remitting objects such as objects with contrast differences on the surface or reflecting surfaces is hereby improved. The masking or different weighting of such light beads is, for example, possible by an adaptation of the previously mentioned modulation function.

It is advantageous for an individual imaging element respectively to include a prism. A lateral deflection can thereby also be achieved in addition to the focusing of a light bead. For example, the reciprocal spacing of the light bead images can thereby be enlarged whereby the resolution of the light sensor can be improved.

In accordance with a preferred embodiment of the invention, the array of individual imaging elements is one-dimensional and extends in the direction of the triangulation. It is, however, also possible to design the array of individual imaging elements in a two-dimensional manner, whereby a higher sensitivity is achieved. A two-dimensional array is in particular sensible when work is carried out with the aforesaid lateral deflection of the light beads.

The pixel array is, however, preferably one-dimensional. The use of very cost-effective pixel arrays, e.g. line sensors, is hereby possible.

Alternatively, the pixel array can be two-dimensional whereby an improved sensitivity of the apparatus is ensured. In accordance with preferred embodiments, the pixel array can be a photodiode array or a CCD sensor or a CMOS sensor.

A two-dimensional pixel array is in turn in particular sensible when work is carried out with the aforesaid lateral deflection of the light beads.

Further preferred embodiments of the invention are set forth in the dependent claims, in the description and in the drawing.

Figure 2:
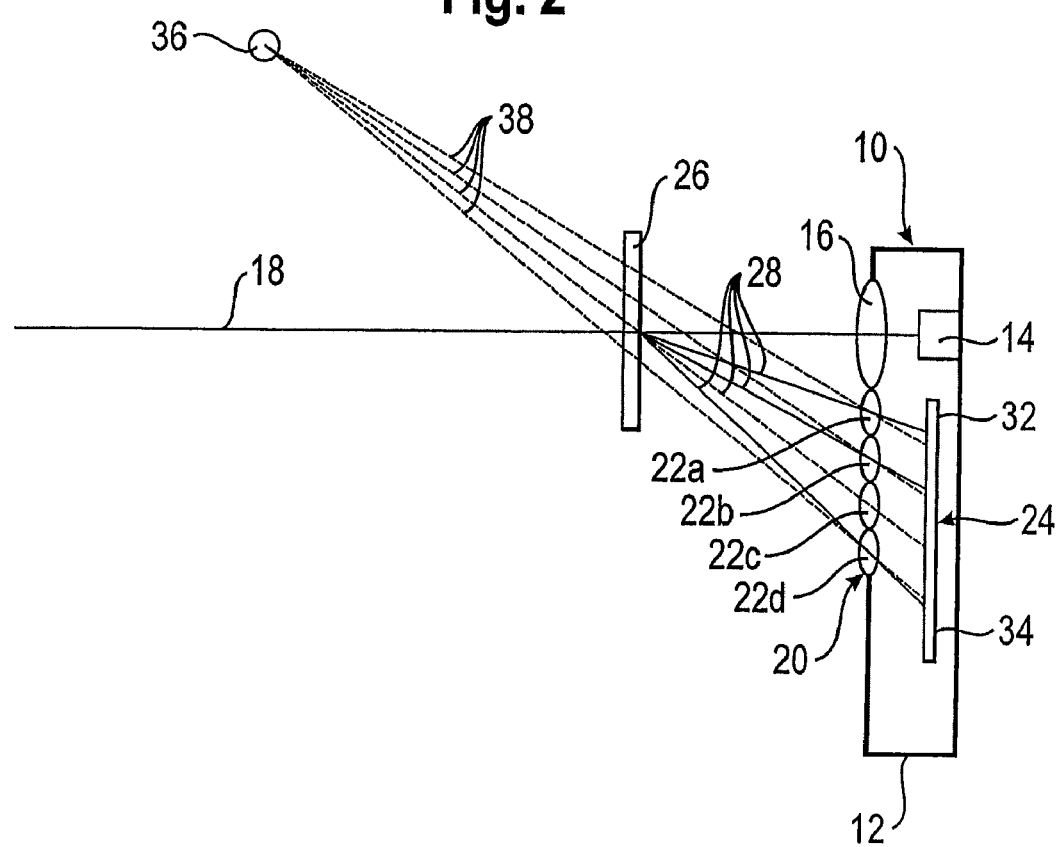
Figure 3:
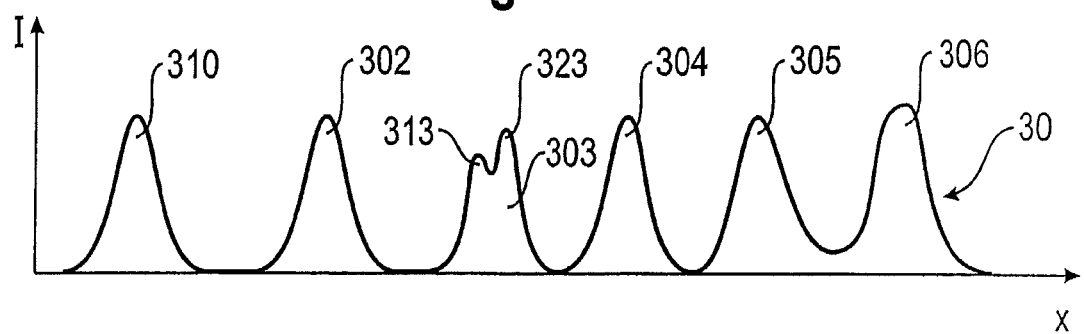
Figure 4:
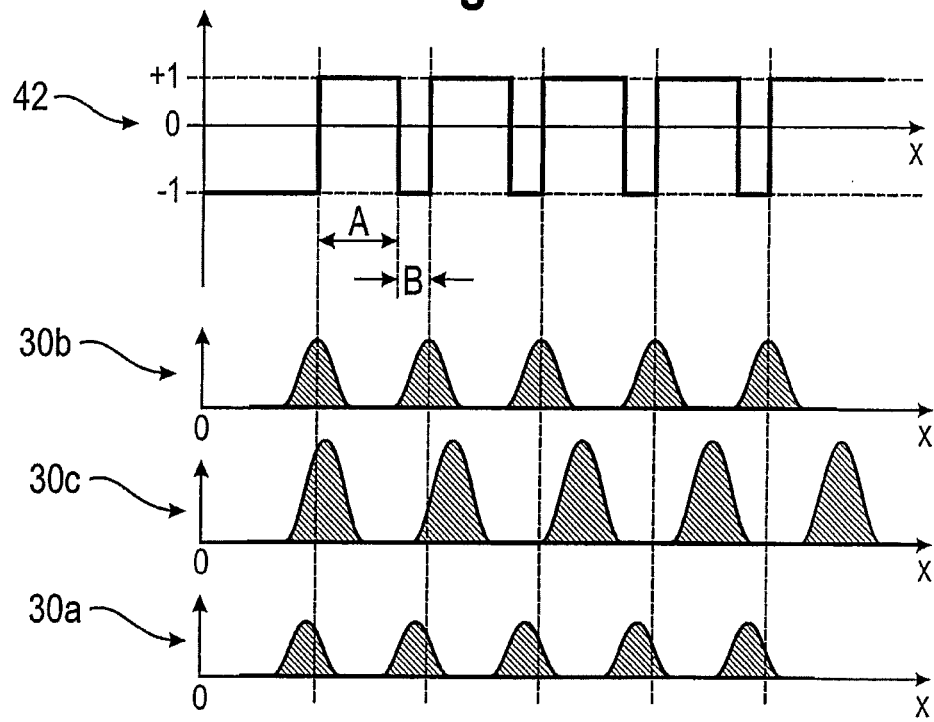
Figure 5:
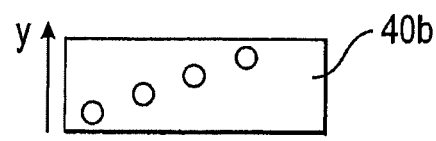
Figure 5:
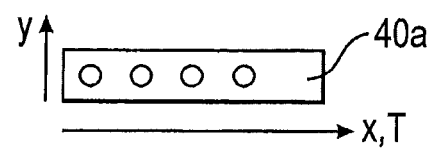

The invention will be explained in more detail in the following with reference to an embodiment and to the drawings. There are shown in these:

FIG. 1 a schematic representation of a triangulation light sensor in accordance with the invention with back-scattering objects at three different spacings;

FIG. 2 a schematic representation of the triangulation light sensor of FIG. 1 with a back-scattering object and an interference light source;

FIG. 3 a received signal pattern generated by an array of individual imaging elements;

FIG. 4 three received signal patterns generated at different scanning distances and a modulation function generated from a received signal pattern; and FIG. 5 two two-dimensional received signal patterns generated by different arrays of individual imaging elements.

FIG. 1 shows a triangulation light sensor 10 schematically whose components are accommodated in a common housing 12. A light source 14 generates light rays which are focused by an optical transmitter device 16 to form a transmitted bundle of rays 18. The bundle of rays 18 is preferably a parallel beam of rays which has a restricted cross-section so that approximately spot-shaped light beads are generated when incident onto objects.

Incandescent lamps, LEDs or other radiation sources are suitable as a light source 14. In particular a laser can be provided as a light source 14 which generates a transmitted bundle of rays 18 with very small divergence and permits an omission of the optical transmitter device 16. Additional diaphragms, not shown, can be provided to restrict the cross-section of the transmitted bundle of rays 18.

A microlens array 20 is arranged beneath the optical transmitter device 16 and includes four individual lenses 22a, 22b, 22c, 22d arranged in linear form. The number of individual lenses 22a to 22d can naturally be substantially larger, with the restriction to four lenses in the Figure only taking place for reasons of clarity.

A pixel array 24 is furthermore arranged in the interior of the housing 12 and detects the images generated by the microlens array 20. The pixel array 24 is only shown schematically here. In this connection, it can, for example, be an array of photodiodes, a CCD sensor or a CMOS sensor, with these in turn being able to be made as one-dimensional line sensors or as two-dimensional arrays. The number of individual picture elements or pixels of the pixel array exceeds the number of individual lenses of the microlens array 20 by a multiple to ensure an adequate resolution.

The dimension of the pixel array 24 in a triangulation direction T indicated by a direction arrow, i.e. the displacement direction of the images on a change of the scanning distance, is larger than the corresponding extent of the microlens array 20 so that at least some of the rays passing obliquely through the microlens array 20 are also still detected.

Objects 26a, 26b, 26c arranged at three different positions are shown in the beam path of the transmitted bundle of rays 18. These objects 26a to 26c have ideally back-scattering surfaces, i.e. the incident bundle of rays 18 consisting of parallel rays generates a more or less spot-shaped light bead on the objects 26a to 26c.

In simplified terms, it is assumed that the previously parallel transmitted rays 18 are scattered back uniformly at least within a specific spatial angle in the direction of the triangulation light sensor 10. The respective rays 28a to 28c scattered back from the objects 26a to c are incident onto the microlens array 20 and are imaged onto the pixel array 24 by the individual lenses 22a to 22d. For reasons of clarity, only the center rays passing through the respective individual lenses 22a to 22d are shown in FIGS. 1 and 2.

The spacing between the microlens array 20 and the pixel array 24 is selected in this connection such that an object located at a medium distance from the microlens array 20 is imaged as sharp. Objects disposed closer or further away, e.g. object 26a or 26c, are disposed at least in part still within the depth of field zone of the individual lenses 22a to 22d.

As already mentioned, the individual lenses 22a to 22d of the microlens array 20 can, however, also have different focal lengths so that an object 26a to 26c is always located at least approximately in the focus of at least one individual lens 22a to 22d at any desired spacing.

The received signal patterns 30a, 30b, 30c generated on the pixel array 24 by the microlens array 20 for the different object positions are shown in FIG. 4. The intensity I detected by the pixel array 24 is drawn with respect to a position x in the received signal patterns 30a to 30c, with the position x corresponding to a location on the pixel array 24 in the triangulation direction T. The peaks shown at the far left in the received signal patterns 30a to 30c in each case correspond to the images of the light bead which were generated by individual lens 22a closest to the transmitted bundle of rays 18. The peaks adjoining at the right were generated by the next individual lens 22b, etc.

The dashed vertical lines in FIG. 4 each mark the positions x at which a respective peak is present in the received pattern 30b.

The back-scattered rays 28c of the object 26c disposed closer to the triangulation light sensor 10 with respect to the object 26b generate the received signal pattern 30c. As can already be recognized from the beam paths in FIG. 1, the peaks of the received signal pattern 30c are displaced to the right in the direction of the larger x, which in FIG. 1 corresponds to a downward displacement, i.e. in the direction of the triangulation direction T marked by the arrow.

If, in contrast, one looks at the received signal pattern 30a generated by the further remote object 26a, it becomes clear that the peaks are displaced to the left in comparison with the received signal pattern 30b.

It furthermore becomes clear from the FIGS. 1 and 4 that the amount of the displacement of the peaks in the received signal patterns 30a or 30c with respect to the received signal pattern 30b is larger for an individual lens further remote from the transmitted bundle of rays 18, i.e. individual lens 22d, than for an individual lens disposed closer to the transmitted bundle of rays 18, i.e. individual lens 22a.

The pixel array 24 can be divided into a far zone 32 and a near zone 34 in accordance with FIG. 1, with the rays 28a scattered back more from further remote objects, such as object 26a, being incident in the far zone 32, and the rays 28b scattered back more from objects located relatively closely to the triangulation light sensor 10, such as object 26c, being incident in the near zone 34.

If now the object 26c were moved even closer to the triangulation light sensor 10, the images of the light bead generated by the outer individual lenses, e.g. the individual lens 22b, would no longer be detected by the pixel array 24. The intensity I of the images which increases as the scanning distance reduces, which can also be recognized from the height of the peaks in the received signal patterns 30a to c of FIG. 4 and which is also caused by the detection of an increasingly larger spatial angle at smaller spacings, is thereby compensated by the reducing number of images detected by the pixel array 24.

The demands on the dynamics of an electronic evaluation unit, not shown, of the triangulation light sensor 10, which can be greater than $10^6$ with conventional light sensors, are thus reduced.

An advantage of the present invention lies in the fact that the distribution of the peaks in the received signal patterns only depends on the scanning spacing of the object detected. An unambiguous association of a received signal pattern with a scanning spacing is therefore possible. Interference radiators located outside the transmitted bundle of rays 18 will generate received signal patterns on the pixel array 24 which do not coincide with any regular received signal pattern.

This circumstance should be explained with reference to FIG. 2. A triangulation light sensor 10 in accordance with FIG. 1 is shown there. The transmitted bundle of rays 18 is incident onto an object 26 and is scattered back onto the pixel array 24 via the microlens array 20. The associated back-scattered rays 28 are shown as solid lines.

An interference light source 36 is additionally present whose interference light rays 38 are incident onto the microlens array 20 at a similar angle to the back-scattered rays 28. These interference light rays 38 are shown in dashed lines. It becomes clear from FIG. 2, however, that only one individual interference light ray 38 incident onto the individual lens 22d is incident onto the microlens array 20 at the same angle as the corresponding ray 28 scattered back at the object 26. The remaining interference light rays 38 are incident onto the microlenses 22a, 22b, 22d at respectively slightly different angles with respect to the back-scattered rays 28 and thus generate a received signal pattern which differs from the received signal pattern generated by the object 26.

Due to the spacing of the interference light source 36 from the axis of the transmitted bundle of rays 18, there can be no position inside the detection zone determined by the transmitted bundle of rays 18 from where an object could generate a received signal pattern which is the same as the received signal pattern generated by the interference light source 36. It is thus possible to unambiguously identity such interference light patterns and optionally to eliminate them from the evaluation.

The separation of the individual images of a light bead required for a correct evaluation of the received signal pattern should be explained with reference to a received signal pattern 30 shown in FIG. 3. The intensity I of the light bead images is again drawn with respect to the position x in the received signal pattern 30 which is shown in FIG. 3 and which includes a total of six peaks or light bead images 301 to 306.

The two first light bead images 301, 302 correspond to ideal light bead images and are separated from one another by a clearly recognizable minimum. The light bead image 303 is also delineated from the adjacent light bead image 302 by a clear minimum, but has a minimum caused, for example, by a defective position of the pixel array so that the light bead image 303 has two secondary maxima 313, 323. The triangulation light sensor 10 in accordance with the invention will, however, recognize that the spacing of these secondary maxima 313, 323 is too small and will therefore not split the light bead image 303 into two individual light beads.

The light bead image 304 has a regular distribution. The light beads 305 and 306, however, have a somewhat irregular shape and are slightly fused with one another due to a less clearly formed minimum. This minimum is, however, sufficient to carry out a separation of the two light bead images 305, 306.

The following three method variants can generally be used for the determination of the scanning distance between the apparatus and the object:

In a first variant, respective reference signal patterns are generated by means of a test object with a surface which remits as ideally as possible within the framework of a teaching phase for a plurality of preset reference scanning distances. These reference signal patterns are stored together with the associated reference scanning distance value. This reference scanning value so-to-say represents a reference value for the corresponding signal pattern.

The storage of the reference signal patterns can take place in compressed form in this connection for the reduction of the required storage space. The number of the stored reference signal patterns should cover the total required detection zone of the triangulation light sensor 10 and should take place in sufficiently small scanning distance steps.

In a later live operation following the teaching phase, the best suitable pattern is determined from the stored reference signal patterns for a currently taken received signal pattern. This pattern comparison can take place in accordance with methods known in image processing. Correlation methods are in particular suitable here.

The reference scanning distance value of the pattern determined in this manner is output by the evaluation unit as a scanning distance value, with interpolation being able to take place, as already mentioned.

In a second method variant, the positions of the images of the light bead are partly or completely determined in a received signal pattern, with selectively both the position of the maximum and the position of the focal point of a light bead image being able to be determined. The positions of the light bead images determined in this manner are each associated to that individual lens 22a to 22d which has generated the respective light bead image on the pixel array 24.

A respective spacing from a respective specific reference point likewise associated with the respective individual lens 22a to 22d can now be calculated from these positions. These reference points can be fixed while taking account of the geometry of the triangulation light sensor 10, i.e. of the relevant spacings of the components such as optical transmitter device 16, pixel array 24 and microlens array 22 as well as of the focal lengths and spacings of the individual lenses 22a to 22d. The position of an image of the light bead and of a reference point associated with the same individual lens thus form a coordinate pair from whose difference the scanning distance is finally calculated, likewise while taking account of the light sensor geometry.

In this manner, a plurality of measured values for the scanning distance is therefore calculated from which the scanning spacing to be output is calculated by averaging. In this context, different measured values can be weighted differently, as will be explained in more detail in the following.

In a modification of this method variant, the reference points can be fixed by the positions of the images of a reference signal pattern taken within the framework of a teaching process at a reference scanning distance. The scanning distance is calculated while taking consideration of the reference scanning distance in this connection.

In figurative terms, this method variant represents an averaging over the spacing values determined by means of a plurality of triangulation light sensors, with an individual light sensor in each case being formed by a specific individual lens with the triangulation light sensor 10 in accordance with the invention. In this manner, external interference influences or also artifacts caused by defects of the pixel array 24 can be suppressed in the calculation of the scanning distance. It is thus possible, for example, to weight the spacing determined for the light bead 303 shown in FIG. 3 less than, for example, the light bead images 301, 302 or 304. With an even larger difference from a known pattern, the corresponding light bead image can also be completely rejected.

It is possible on the basis of such a plausibility check to output an error message when differences are too large or to suppress a change of a switching state of the evaluation unit for so long until a plausible signal is available. Here, for example, a maximum permitted number of non-standard light bead images can be preset on whose exceeding the error message is output.

In accordance with a further modification of the method explained above, it is not distances from reference points which are determined. Instead, the scanning distance determination takes place from the spacings of the individual images of the light bead from one another within a received signal pattern. Here again, a reference signal pattern generated at a reference scanning distance can also be used as the basis.

The association of the individual positions of the images of the light bead or of the light bead images with a specific individual lens can take place, on the one hand, by counting off the determined maxima and/or focal points. On the other hand, it is possible to use a two-dimensional pixel array 24 and to provide each of the individual lenses 22a to 22d of the microlens array 20 with their own prism which effects a deflection perpendicular to the triangulation direction T which is different for each individual lens 22a to 22d.

Corresponding received signal images 40a, 40b are shown in FIG. 5 which illustrate this measure. The received signal image 40a which is shown in the lower part of FIG. 5 and which was generated by a two-dimensional pixel array 24 shows a received signal distribution, where the position or the first dimension of the pixel array 24 is designated by x and coincides with the triangulation direction T. The y axis y designates the second dimension of the pixel array 24. As can be recognized, the four images of the light bead are disposed on a line parallel to the x axis in the lower image of FIG. 5.

The upper part of FIG. 5 shows a received signal image 40b which was generated by a microlens array 20 provided with individual prisms, with here the second dimension of the pixel array 24, i.e. in the y direction, being somewhat larger than in the lower received signal image 40a. The deflection angles of the prisms associated with the individual lenses 22a to 22d increase in each case from individual lens to individual lens so that the imaging of the light bead takes place at a respectively larger y position of the pixel array 24 as the x position increases, in dependence on the imaging individual lens.

It is thus possible in a simple manner with knowledge of the y position of a specific image on the pixel array 24 to carry out the association with a specific individual lens 22a to d of the microlens array 20. A better separation of adjacent images results as a further advantage from the use of such individual prisms since the spacing of the images from one another is hereby increased.

The third method variant for the scanning distance determination should now be explained with reference to FIG. 4. This variant corresponds to claim 6. In FIG. 4, a modulation function 42 is shown in addition to the already known received signal patterns 30a to 30c and its generation from a reference signal pattern during a teaching process and its following use on received signal patterns 30a to 30c is described in the following.

The modulation function M(x), which is shown by the reference numeral 42 in FIG. 4, results from a received signal pattern $S_{ref}(x)$, which is identical to the received signal pattern 30b in accordance with FIG. 4, according to the following rules:

M(x) only adopts the values −1 and +1, that is represents a rectangular function.

Let M(x=0)=−1.

At the positions x at which $S_{ref}(x)$ has a maximum, M(x) changes from −1 to +1.

M(x) changed at a position x from +1 to −1 which lies between two maxima and is determined such that the relationship of a spacing A to the previous maximum and a spacing B to the following maximum has a specific preset relationship. In the present example in accordance with FIG. 4, this relationship amounts to A:B=5:2.

A value D is calculated from the modulation function M(x) defined in this manner and from a received signal pattern S(x) in accordance with the equation:

$$D = \sum_{x=0}^{N} S(x) \cdot M(x)$$

where N is the number of pixels of the pixel array 24 in the triangulation direction T, i.e. in the x direction.

In figurative terms, this operation means, with respect to FIG. 4, that the portions of the peaks of the received signal patterns 30a to 30c which are disposed to the left of the dashed vertical lines are folded downward, at least within the spacing B. If the aforesaid operation is applied to the received signal pattern 30b which has served as the reference $S_{ref}(x)$ for the generation of the modulation function M(x), 42, the value 0 results for D.

If the operation is applied to the received signal pattern 30c which corresponds to a smaller scanning distance than with the reference signal pattern 30b, a positive value results for D. This can be thought of in figurative terms such that a smaller portion of each distribution is weighted as negative and a larger portion as positive here.

If, in contrast, the said operation is carried out with the received signal pattern 30a which corresponds to a larger scanning distance, negative values result for D. This also becomes clear from FIG. 4 if the portions of the respective intensity distributions disposed to the left of the dashed lines are thought of as folded downward.

In accordance with this method variant, on the one hand, a falling short of or an exceeding of a scanning distance threshold value can be determined which corresponds to the reference scanning distance associated with the reference function $S_{ref}(x)$. On the other hand, a scanning distance value can also be determined from the value D since the amount of D increases as the difference from the reference scanning distance increases.

It is furthermore possible for the modulation function M(x) also to adopt values different from +1 or −1 section-wise. Artificial images can thereby be weighted less. It is also possible by an adaptation of the modulation function in the use of individual lenses with different focal lengths to give greater weight to light beads which are in particular imaged sharply at the reference scanning distance used during the teaching process or to mask blurred images. The detection of objects with non ideally back-scattering surfaces is thereby improved.

Furthermore, M(x) does not necessarily have to be a rectangular function, but can also adopt intermediate values. This is in particular sensible at smaller spatial resolution of the x positions.

It should finally be noted that the method variants disclosed here cannot only be used selectively, but can also be realized next to one another in the same triangulation light sensor. Furthermore, features listed in specific method variants can also be realized sensibly in other variants.

REFERENCE NUMERAL LIST

| | |
|---|---|
| 10 | triangulation light sensor |
| 12 | housing |
| 14 | light source |
| 16 | optical transmitter device |
| 18 | transmitted bundle of rays |
| 20 | microlens array |
| 22 | individual lens |
| 22a-22d | individual lens |
| 24 | pixel array |
| 26 | object |
| 26a, 26c | object |
| 28 | back-scattered rays |
| 28a-28c | back-scattered rays |
| 30 | received signal pattern |
| 30a-30c | received signal pattern |
| 32 | far zone |
| 34 | near zone |
| 36 | interference light source |
| 38 | interference light rays |
| 40a, 40b | received signal image |
| 42 | modulation function |
| 301-306 | light bead image |
| 313, 323 | secondary maximum |
| T | triangulation direction |
| I | intensity |
| x | position |
| y | y axis |
| A, B | spacing |

The invention claimed is:

1. A method for the detection of an object by means of an optoelectronic apparatus comprising:

generating light rays by a light source that are incident onto an object as a light bead;

detecting the light rays scattered back and/or reflected from the object by a receiver arrangement in accordance with a triangulation principle;

outputting an object detection signal including information on a scanning distance between the apparatus and the object, with the light rays acting on a pixel array consisting of photodetectors via an imaging element in the receiver arrangement, wherein the imaging element is only an array of individual imaging elements positioned before the pixel array, said array generating a received signal pattern on the pixel array corresponding to a plurality of mutually spaced apart images of the light bead;

determining the information on the scanning distance from the received signal pattern, wherein the position of at least two images of the light bead is determined in the received signal pattern, with the respective position of an image being associated with that individual imaging element which has generated the respective image, and wherein the scanning distance is determined from at least one distance between the positions of respective images of the light bead generated from different individual imaging elements.

2. A method in accordance with claim 1, further comprising determining the scanning distance from the spacing between at least one position and a reference point associated with the respective individual imaging element.

3. The method in accordance with claim 2, further comprising:
generating a reference signal pattern for at least one reference scanning distance;
determining the position of at least one image of the light bead as the reference point in the reference signal pattern;
determining the scanning distance from at least one spacing between a position determined from the received signal pattern; and
determining the reference point from the reference signal pattern and the reference scanning distance.

4. The method in accordance with claim 1, further comprising:
generating a respective reference signal pattern for a plurality of different reference scanning distances;
storing the respective reference signal pattern together with the associated reference scanning distance;
determining the reference signal pattern having the highest coincidence with the received signal pattern; and
outputting the reference scanning distance associated with the determined reference signal pattern as the scanning distance value.

5. The method in accordance with claim 4, wherein determining the reference signal pattern having the highest coincidence with the received signal pattern is determined by correlation.

6. The method in accordance with claim 1, further comprising:
taking a reference signal pattern having maxima corresponding to a plurality of images of the light bead at a reference scanning spacing;
calculating a modulation function from the reference signal pattern which can adopt a positive value and a negative value, with a change from a negative value to a positive value taking place at a position at which the reference signal pattern has a maximum and a change from a positive value to a negative value taking place at a position which lies between this maximum and an adjacent maximum;
determining the modulation function by a fraction of the spacing of the two maxima;
calculating the product of the received signal pattern with the modulation function;
calculating the sum or the integral over the product for a presettable interval of positions;
calculating the scanning distance value as the information on the scanning distance from the sum or from the interval or a falling short of; and/or
determining exceeding of a scanning distance threshold value, preset by the reference scanning distance from the sign of the sum or of the integral.

7. The method in accordance with claim 6, wherein the positive value and the negative value of the modulation function are equal in amount.

8. The method in accordance with claim 6, wherein the positive value and/or the negative value of the modulation function are different for different sections.

9. The method in accordance with claim 1, further comprising determining the position of an image of the light bead from the maximum and/or from the focal point of the intensity distribution of the image of the light bead.

10. The method in accordance with claim 1,
wherein the pixel array is a two-dimensional array;
wherein an individual imaging element each includes a prism, with the deflection direction of the prism being perpendicular to a triangulation plane defined by the transmitted and received rays and the amount of the deflection being different for each individual imaging element; and
wherein an image is associated with an individual imaging element on the basis of its position (y) in the deflection direction.

11. The method in accordance with claim 1, further comprising determining images of the light bead which differ in their intensity distribution from a preset pattern.

12. The method in accordance with claim 11, wherein the images of the light bead differing from the pattern are not taken into account on the determination of the information on the scanning distance or are taken into account with a reduced weighting.

13. The method in accordance with claim 11, further comprising:
outputting an error message on the exceeding of a preset limit value for the permitted degree of images of the light bead differing from the pattern;
suppressing an output of an object detection signal for so long until the permitted degree of images differing from the pattern is fallen below again.

14. An optoelectronic apparatus for the detection of an object in accordance with a triangulation principle comprising:
a light source for the generation of a light bead on the object; and
a receiver arrangement for the detection of light rays scattered back and/or reflected from an object and an evaluation unit,
wherein the receiver arrangement has an element imaging the light rays as well as a pixel array consisting of photodetectors,
wherein the imaging element is only an array of individual imaging elements positioned before the pixel array, said array being made for the generation of a received signal pattern on the pixel array corresponding to a plurality of mutually spaced apart images of the light bead;
wherein the evaluation unit is designed for the determination of information on a scanning distance between the apparatus and the object from the received signal pattern,
wherein the position of at least two images of the light bead is determined in the received signal pattern, with the respective position of an image being associated with that individual imaging element which has generated the respective image, and
wherein the scanning distance is determined from at least one distance between the positions of respective images of the light bead generated from different individual imaging elements.

15. The apparatus in accordance with claim 14, wherein the array of individual imaging elements includes a microlens array including a plurality of individual lenses.

16. The apparatus in accordance with claim 14, wherein the array of individual imaging elements includes an array of diffractive individual elements.

17. The apparatus in accordance with claim 16, wherein the array of diffractive individual elements is made as a film.

18. The apparatus in accordance with claim 14, wherein the individual imaging elements have different focal lengths.

19. The apparatus in accordance with claim 14, wherein an individual imaging element each includes a prism.

20. The apparatus in accordance with claim 19, wherein the deflection direction of the prisms is perpendicular to a triangulation plane defined by the transmitted rays and received rays.

21. The apparatus in accordance with claim 19, wherein the degree of deflection is different for different prisms and preferably varies in a direction (T) of the triangulation.

22. The apparatus in accordance with claim 14, wherein the array of individual imaging elements is one-dimensional and extends in a direction (T) of the triangulation.

23. The apparatus in accordance with claim 14, wherein the pixel array is one-dimensional.

24. The apparatus in accordance with claim 14, wherein the pixel array is two-dimensional.

25. The apparatus in accordance with claim 14, wherein the pixel array is a photodiode array or a CCD sensor or a CMOS sensor.

26. A method for the detection of an object by means of an optoelectronic apparatus, comprising:

detecting light rays generated by a light source that are incident onto an object as a light bead and the light rays scattered back and/or reflected from the object by a receiver arrangement in accordance with a triangulation principle;

outputting an object detection signal including information on a scanning distance between the apparatus and the object, with the light rays acting on a pixel array consisting of photodetectors via an imaging element in the receiver arrangement, wherein the imaging element is only an array of individual imaging elements positioned before the pixel array, said array generating a received signal pattern on the pixel array corresponding to a plurality of mutually spaced apart images of the light bead;

determining the information on the scanning distance from the received signal pattern, wherein a respective reference signal pattern is generated for a plurality of different reference scanning distances and is stored together with the associated reference scanning distance, wherein the reference signal pattern having the highest coincidence with the received signal pattern is determined, and wherein the reference scanning distance associated with the determined reference signal pattern is output as the scanning distance value.

27. An optoelectronic apparatus for the detection of an object in accordance with a triangulation principle comprising:

a light source for the generation of a light bead on the object; and a receiver arrangement for the detection of light rays scattered back and/or reflected from an object and an evaluation unit, wherein the receiver arrangement has an element imaging the light rays as well as a pixel array consisting of photodetectors, wherein the imaging element is only an array of individual imaging elements positioned before the pixel array, said array being made for the generation of a received signal pattern on the pixel array corresponding to a plurality of mutually spaced apart images of the light bead, wherein the evaluation unit is designed for the determination of information on a scanning distance between the apparatus and the object from the received signal pattern, wherein a respective reference signal pattern is generated for a plurality of different reference scanning distances and is stored together with the associated reference scanning distance, wherein the reference signal pattern having the highest coincidence with the received signal pattern is determined, and wherein the reference scanning distance associated with the determined reference signal pattern is output as the scanning distance value.

28. The method in accordance with claim 26, wherein the reference signal pattern having the highest coincidence with the received signal pattern is determined by correlation.

29. The method in accordance with claim 27, wherein the reference signal pattern having the highest coincidence with the received signal pattern is determined by correlation.

* * * * *

UNITED STATES PATENT AND TRADEMARK OFFICE
CERTIFICATE OF CORRECTION

PATENT NO. : 7,760,338 B2 Page 1 of 1
APPLICATION NO. : 12/017601
DATED : July 20, 2010
INVENTOR(S) : Waslowski et al.

It is certified that error appears in the above-identified patent and that said Letters Patent is hereby corrected as shown below:

On the Title Page. Item (73),
Assignee's Address      Delete "Waldkrich/Breisgau (DE)" and insert
                        --Waldkirch/Breisgau (DE)--
Column 6, Line 6        Delete "drawing" and insert --drawings--
Column 8, Line 43       Delete "identity" and insert --identify--
Column 14, Line 28      Insert --and/or-- after "pattern;"

Signed and Sealed this

Sixteenth Day of November, 2010

David J. Kappos
*Director of the United States Patent and Trademark Office*